United States Patent
Doering

(10) Patent No.: US 9,238,987 B2
(45) Date of Patent: Jan. 19, 2016

(54) METHOD AND DEVICE FOR TESTING THE FUNCTION CAPACITY OF AN NO OXIDATION CATALYST

(71) Applicant: MAN Bus & Truck AG, Munich (DE)

(72) Inventor: Andreas Doering, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 98 days.

(21) Appl. No.: 13/743,698

(22) Filed: Jan. 17, 2013

(65) Prior Publication Data

US 2013/0276427 A1  Oct. 24, 2013

(30) Foreign Application Priority Data

Apr. 23, 2012  (DE) .......................... 10 2012 007 897

(51) Int. Cl.

| | |
|---|---|
| G01M 15/10 | (2006.01) |
| F01N 13/00 | (2010.01) |
| F01N 3/10 | (2006.01) |
| F01N 11/00 | (2006.01) |
| F01N 13/02 | (2010.01) |
| F01N 3/023 | (2006.01) |
| F01N 3/20 | (2006.01) |

(52) U.S. Cl.
CPC .............. *F01N 13/00* (2013.01); *F01N 3/0231* (2013.01); *F01N 3/103* (2013.01); *F01N 11/007* (2013.01); *F01N 13/02* (2013.01); *F01N 3/2066* (2013.01); *F01N 2560/026* (2013.01); *F01N 2610/02* (2013.01); *Y02T 10/47* (2013.01)

(58) Field of Classification Search
CPC ..... G01M 15/10; F01N 11/00; F01N 2550/02; F01N 2560/026
USPC .......................................... 73/114.71, 114.75
See application file for complete search history.

(56) References Cited

U.S. PATENT DOCUMENTS

| | | | | |
|---|---|---|---|---|
| 7,658,093 | B2 * | 2/2010 | Nishina et al. ............... | 73/61.46 |
| 8,056,404 | B2 * | 11/2011 | Murase ...................... | 73/114.69 |
| 8,307,699 | B2 * | 11/2012 | Sawada et al. .............. | 73/114.75 |
| 8,555,623 | B2 * | 10/2013 | Yasui et al. ...................... | 60/301 |
| 2007/0209428 | A1 * | 9/2007 | Nishina et al. ............... | 73/61.76 |
| 2011/0000290 | A1 * | 1/2011 | Sawada et al. ............. | 73/114.75 |
| 2012/0000270 | A1 * | 1/2012 | Narita .......................... | 73/23.31 |
| 2012/0047879 | A1 * | 3/2012 | Ujihara et al. ................. | 60/287 |

FOREIGN PATENT DOCUMENTS

| | | | |
|---|---|---|---|
| DE | 10 2004 009 615 | A1 | 9/2005 |
| EP | 1373693 | A1 | 1/2004 |
| EP | 1936140 | A1 | 6/2008 |

* cited by examiner

*Primary Examiner* — Eric S McCall

(74) *Attorney, Agent, or Firm* — Lucas & Mercanti, LLP

(57) ABSTRACT

The invention concerns a method and a device for testing the function capacity of an NO oxidation catalyst (5) which is used to reduce nitrous oxides ($NO_x$) contained in the exhaust gas flow of an internal combustion engine (1) operated with air surplus. In the exhaust gas flow which is supplied to the NO oxidation catalyst (5), a change is made in the concentration of a reducing agent and the resulting change in $NO_x$ concentration in the exhaust gas flow within the NO oxidation catalyst (5) and/or downstream after the NO oxidation catalyst (5) is determined and used to test its function capacity.

20 Claims, 2 Drawing Sheets

METHOD AND DEVICE FOR TESTING THE FUNCTION CAPACITY OF AN NO OXIDATION CATALYST

CROSS-REFERENCE TO RELATED APPLICATIONS

This application claims the priority of DE 10 2012 007 897.8 filed Apr. 23, 2012, which is incorporated by reference herein.

BACKGROUND OF THE INVENTION

1. Field of the invention

The invention concerns a method and a device for testing the function capacity of an NO oxidation catalyst.

2. Description of Prior Art

Internal combustion engines of motor vehicles operated with air surplus are fitted with catalytically functioning post-treatment systems to reduce pollution, which systems comprise $NO_x$ storage catalysts, SCR catalysts and also particulate filters, in order to be able to comply with legally prescribed exhaust emission limits. The common feature of all these systems is that nitrogen dioxide ($NO_2$) constitutes an important component of the reactions proceeding in the post-treatment systems. This nitrogen dioxide is formed by usually platinum-containing NO oxidation catalysts (NO=nitrogen monoxide) and the nitrous oxides ($NO_x$) contained in the exhaust gas, from the nitrogen monoxide emitted by the combustion engine:

$$2\,NO+O_2 \leftrightarrow 2NO_2 \qquad \text{Equation 1}$$

In real operation however the sulphurisation of these NO oxidation catalysts by the sulphur contained in the fuel and/or the engine oil constitutes a considerable problem, Due to combustion, this sulphur leads to the formation of sulphur dioxide ($SO_2$) which is oxidised on the NO oxidation catalyst into $SO_3$ according to the equations below:

$$S+O_2 \rightarrow SO_2 \qquad \text{Equation 2}$$

$$2\,SO_2+O_2 \rightarrow SO_3 \qquad \text{Equation 3}$$

Here it has been found that the quantity of $SO_3$ formed and the quantity of $NO_2$ formed are directly correlated, so that an NO oxidation catalyst which desirably forms large quantities of $NO_2$ at the same time generates undesirably large quantities of $SO_3$. This $SO_3$ with the metal-containing catalyst washcoat forms sulphates, or with water forms sulphuric acid, which are physiosorbed on the surface of the catalyst. Both lead to coverage of the active centre of the catalyst and hence a fall in its activity, which in turn reduces the activity of downstream exhaust gas post-treatment components such as SCR catalysts or particulate filters.

For this reason it is necessary to monitor the state of an NO oxidation catalyst or its oxidation capacity.

For three-way catalysts, a method is known from DE 10 2004 009 615 B4 in which the oxygen ($O_2$) storage capacity is determined using periodic fluctuations between lean and rich engine operation and observation of the catalyst reaction using a downstream lambda sensor, and structured such that in the case of a damped amplitude of residual $O_2$ fluctuation, the catalyst still has an $O_2$ storage capacity, while in the other case it is no longer able to absorb $O_2$. This method cannot be applied to NO oxidation catalysts for two reasons: firstly these catalysts have no pronounced $O_2$ storage capacity, and secondly diesel engines which normally run lean or direct-injection petrol engines cannot easily be run rich. Here, both the soot emissions and the thermal load on the engines would rise undesirably and to an extreme degree.

In so-called diesel oxidation catalysts which serve to oxidise unburnt hydrocarbons and carbon monoxide, a second method is known from EP 1 373 693 B2. Here periodically the hydrocarbon oxidation is raised, usually by late post-injection of fuel into the combustion chamber, and the exothermy of the oxidation of these hydrocarbons on the diesel oxidation catalyst is determined using thermo-elements. The temperature rise detected is compared with an expected value determined from the added quantity of hydrocarbons. If the measured and expected values deviate too greatly from each other, damage to the diesel oxidation catalyst can be concluded. The disadvantage of this method is that large quantities of hydrocarbons must be added, since otherwise because of the large thermal mass and the resulting low temperature rise, no system reaction can be observed. This leads to a clear deterioration in the efficiency of the internal combustion engine and hence to a rise in fuel consumption. A further disadvantage lies in the high thermal load of the catalyst which, for the NO oxidation catalysts already described above, can even lead to their damage. In particular in internal combustion engines fitted in vehicles, because of the widely varying ambient conditions and the resulting fluctuating temperature losses of the exhaust gas system, the problem can also arise that temperature detection can be subject to a high measurement inaccuracy.

EP 1 936 140 A1 already discloses a method for monitoring an exhaust gas post-treatment system of an internal combustion engine in which a first lambda sensor to detect the air ratio is arranged in the exhaust gas flow upstream before the exhaust gas post-treatment system, and in which a second lambda sensor to detect the air ratio is arranged further downstream of the exhaust gas post-treatment system. To monitor the function capacity of the exhaust gas post-treatment system, the internal combustion engine is brought into an operating mode in which the exhaust gases extracted from the cylinders contain such a high concentration of unburnt hydrocarbons that the first sensor works defectively, such that this first sensor indicates a higher air ratio in comparison with the air ratio actually present in the exhaust gas, wherein the malfunction of the exhaust gas post-treatment system is assumed if the two air ratios are substantially the same.

SUMMARY OF THE PRESENT INVENTION

The present invention is based on the object of creating a method for testing the function capacity of an NO oxidation catalyst which is fitted in the exhaust pipe of an internal combustion engine operated with air surplus, which method can easily be carried out with high function reliability even at low temperatures of the exhaust gas flow.

The method according to an embodiment of the present invention provides that in the exhaust gas flow which is supplied to the NO oxidation catalyst, a change in concentration of a reducing agent is made and the resulting change in $NO_x$ concentration in the exhaust gas flow within the NO oxidation catalyst and/or downstream after the NO oxidation catalyst is determined and evaluated to test its function capacity. Preferably, a defined quantity of reducing agent is added and/or generated upstream before the NO oxidation catalyst. It is however also possible to change the operation of the internal combustion engine so that a change in the reducing agent concentration in its exhaust gas flow results. In the NO oxidation catalyst, the reducing agent is oxidised by means of the $NO_x$ contained in the exhaust gas flow so that there is a change in $NO_x$ concentration within and/or downstream after the NO oxidation catalyst. A change in concentration of the reducing agent contained in the exhaust gas upstream before the NO oxidation catalyst, with a properly functioning NO oxidation catalyst, must give a sufficiently large change in $NO_x$ concentration within and/or downstream after the NO oxidation catalyst. If this change in $NO_x$ concentration is too low, a malfunction of the NO oxidation catalyst can be concluded. A defective or deteriorated function capacity of the NO oxidation catalyst can be indicated for example by a corresponding fault message.

The $NO_x$ concentration within and/or downstream after the NO oxidation catalyst can easily be measured by means of an $NO_x$ sensor which measures the $NO_x$ concentration before and after the change in concentration of reducing agent as $NO_x$ actual values. The difference between the two $NO_x$ actual values is a measure of the oxidation capacity of the NO oxidation catalyst if, apart from the change in reducing agent, no other system parameters have been changed, it is however also possible that associated $NO_x$ nominal values are stored in a map for various other system parameters, which values are then compared with the measured $NO_x$ actual values and evaluated after a change in concentration of reducing agent.

To determine the $NO_x$ concentration upstream before the NO oxidation catalyst, an $NO_x$ sensor can be provided there, wherein the $NO_x$ concentration can also be determined by means of corresponding mathematical models taking into account the respective operating state of the internal combustion engine.

If the internal combustion engine is in a stationary operating mode, it is also possible to determine the change downstream after the NO oxidation catalyst after an increase in the concentration of reducing agent, using the value before the increase in concentration of reducing agent, and compare this value with the nominal or expected value for the $NO_x$ concentration. An added and/or generated quantity of reducing agent can be predefined such that the reducing agent completely reduces the nitrous oxides ($NO_x$) contained in the exhaust gas flow before the NO oxidation catalyst if the NO oxidation catalyst is functioning correctly. If for such a predefined quantity of reducing agent, no complete reduction of nitrous oxides can be found, this means that the NO oxidation catalyst is no longer functioning correctly. There is no need here to determine the $NO_x$ concentration precisely, and instead a case distinction can be made between "$NO_x$ still present" and "no $NO_x$ present". Accordingly very economical step $NO_x$ sensors, which supply a step change in signal, can be used if the state changes from "$NO_x$ still present" to "no $NO_x$ present".

It is recommended using as reducing agent hydrocarbon or carbon monoxide, which are both generated by adjusting the engine parameters, e.g. by retarding the fuel injection time and/or by activating a late post-injection without additional devices.

These reducing agents react with the nitrous oxides contained in the exhaust gas according to the following equations:

"HC"+2 NO→N$_2$+H$_2$O+CO$_2$   Equation 4

2 CO+2 NO→N$_2$+2CO$_2$   Equation 5

The use of carbon monoxide compared with hydrocarbons has the advantage that carbon monoxide is oxidised at significantly lower temperatures than is the case with long-chain hydrocarbons from fuel. In the prior art, below a specific temperature, this leads to no conversion being possible and hence no testing using hydrocarbons, since both the nominal value and the actual value are zero. Therefore the use of carbon monoxide as a reducing agent is beneficial in particular at such low temperatures as occur in internal combustion engines in which at least one exhaust turbocharger is used. A further problem in the use of hydrocarbons is the coking of the catalyst by long-chain hydrocarbon compounds, in particular at low temperatures.

According to an embodiment of the present invention, the reducing agent required to monitor the function capacity of the NO oxidation catalyst is generated by homogenous charge compression ignition of the internal combustion engine or by partly homogenous internal combustion engine operation. In homogenous charge compression ignition (HCCI, also called controlled auto-ignition or CAI), to increase the carbon monoxide emissions in the test phase a combustion process is used in which the fuel is distributed as homogenously as possible in the combustion chamber and then auto- ignited by compression. This usually takes place with a defined mixing of fuel and fresh air before the cylinders of the internal combustion engine. The aim of this homogenous charge compression ignition is to initiate the combustion in the entire combustion chamber as simultaneously as possible. With this combustion method, firstly the $NO_x$ and soot emissions can be lowered substantially while secondly the carbon monoxide emissions rise.

The disadvantage of the homogenous combustion process in direct injection internal combustion engines in which the fuel is injected directly into the combustion chamber on normal operation is that additional devices must be provided in the intake tract to introduce fuel.

With partly homogenous charge compression ignition, in direct injection combustion engines the injection time is advanced to such a degree that fuel and air only mix in the combustion chamber. Because of the early injection time, ignition of the fuel droplets is avoided and instead their evaporation is promoted by a relatively long dwell time. However, complete homogenous mixing of fuel and air does not usually occur, so that the term partly homogenous charge compression ignition is used. Nonetheless, here too there is a strong rise in carbon monoxide emissions. At the same time usually the emission of hydrocarbons rises, but with two considerable differences from a method which is based on retarding the injection time. Firstly the carbon monoxide concentrations in homogenous or partly homogenous charge compression ignition are substantially higher than the hydrocarbon concentrations, while the ratio on retardation shifts in the direction of hydrocarbon concentrations and these are usually considerably higher than the carbon monoxide concentrations. Secondly the hydrocarbons emitted on homogenous or partly homogenous charge compression ignition are considerably shorter-chained, usually in the range from 1 to 5 carbon atoms, so that sooting of the oxidation catalysts by long-chained, pyrolysed and condensed hydrocarbons can be avoided.

It is particularly preferred, in particular in partly homogenous internal combustion engine operation, to apply a method in which the injection time is advanced in the test phase, in particular to at least 15° crank angle to maximum 370° crank angle before top ignition dead centre, greatly preferably to a value of 20° crank angle to 350° crank angle before top ignition dead centre.

Alternatively or preferably additionally in the test phase, during homogenous or partly homogenous internal combustion engine operation, provision can be made to increase a quantity of exhaust gas recirculated from the exhaust side to the charge air side of the internal combustion engine such that the proportion of exhaust gas in the charge air supplied to the internal combustion engine is at least 30% and at most 80%.

Furthermore it can also be provided that the quantity of exhaust gas recirculated to the combustion chamber of the internal combustion engine in the test phase and the air/fuel ratio lambda are varied such that the combustion chamber temperature in the range of above to including 1.02 lambda does not exceed 1850K, in the range from 1.02 to 0.98 lambda, 1600K, and in the range below 0.98 lambda, 1500K. As a further alternative or additional measure it can be provided that the air/fuel ratio falls below a lambda value of 1 or is less than or equal to 1, wherein, however, upstream of the NO oxidation catalyst $NO_x$ is still contained in the exhaust gas. Further alternatively or additionally it can be provided that the injection pressure of the fuel in the cylinder in the test phase is raised by at least 20% and/or to at least 1200 bar, to a maximum however of 3500 bar.

The ratio of carbon monoxide and hydrocarbon concentration in homogenous or partly homogenous operation is usually at least 2:1.

According to a further preferred implementation of the method, alternatively or additionally to increase the carbon monoxide emissions, it can be provided that the compression ratio in the test phase is lowered by at least 20% but by a maximum of 75% and/or not below 6:1.

Further alternatively or additionally the valve opening times can be changed in the test phase, The aim of these measures is firstly to extend the ignition delay to give a longer homogenisation phase, secondly to lead to a strong pressure rise by reducing the combustion speed. Thus it is possible to close at least one inlet valve before reaching the lower charge change dead centre, Thus with a closed exhaust valve, there is a reduction in combustion chamber pressure and associated with this a fall in combustion chamber temperature. Also a very late closing of the intake valve after the lower charge change dead centre is conceivable, whereby air already drawn in is expelled again via the inlet valves. This method is known as the Miller cycle and because of the lower fill level, leads to lower peak pressures during combustion. A further possibility is to change the valve opening times in the test phase such that at least one exhaust valve remains open longer, whereby the remaining gas proportion is raised by backflow of exhaust gas from the exhaust gas tract and as a result the combustion speed is reduced. The valve opening times can be varied in a manner known in itself using a variable valve drive.

As SCR catalysts, like platinum-containing NO oxidation catalysts, have an $NO_x$ reduction capacity in the presence of hydrocarbons or carbon monoxide, they can be included in the determination of the NO oxidation capacity. Since in the SCR method (selective catalytic reduction) in normal operation normally one $NO_x$ sensor is arranged downstream after the SCR catalyst to control the addition of reducing agent, this $NO_x$ sensor can also be used for testing the NO oxidation capacity of the NO oxidation catalyst. The oxidation capacity of the NO oxidation catalyst arranged upstream before the SCR catalyst can be tested by means of the $NO_x$ sensor arranged after the SCR catalyst. During the testing process an addition of reducing agents, in particular the addition of ammonia precursor substances, immediately before the SCR catalyst, is interrupted. As a result the $NO_x$ concentration at the $NO_x$ sensor rises. Then the reducing agent is added before the NO oxidation catalyst as described above and the $NO_x$ value downstream after the SCR catalyst is determined using the $NO_x$ sensor and compared with an expected value. If too great a deviation from the expected value is found, a defective oxidation capacity of the NO oxidation catalyst can be concluded.

The invention is based on the further object of specifying a device for performance of the method according to the invention which can be implemented with technical means as simple as possible.

According to an embodiment of the invention, to perform the method according to the invention a control device is provided which controls a change in concentration of the reducing agent contained in the exhaust gas flow before the NO oxidation catalyst, and by means of a sensor device measures and evaluates the $NO_x$ concentration in the exhaust gas flow within and/or after the NO oxidation catalyst. Using the control device a change in operating state of the internal combustion engine can provoke a change in the concentration of reducing agent in the exhaust gas flow of the internal combustion engine, whereby corresponding changes in the $NO_x$ concentration measured by the sensor device must result if the NO oxidation catalyst is functioning correctly. If unacceptably great deviations from the predefined nominal values for the $NO_x$ concentration are established, the control device can trigger a corresponding fault message.

It is particularly advantageous to arrange an additional $NO_x$ sensor upstream before the NO oxidation catalyst in order here again to allow a precise determination of the $NO_x$ concentration in the exhaust gas flow.

A further advantageous embodiment of the device according to the invention uses a sensor device to determine the $NO_x$ concentration in the exhaust gas flow after the SCR catalyst. In this way the SCR catalyst is included in the testing of the oxidation capacity.

BRIEF DESCRIPTION OF THE DRAWINGS

The invention is now described in more detail below with reference to embodiment examples shown in the drawings.

DETAILED DESCRIPTION OF THE PREFERRED EMBODIMENTS

Figure 1:
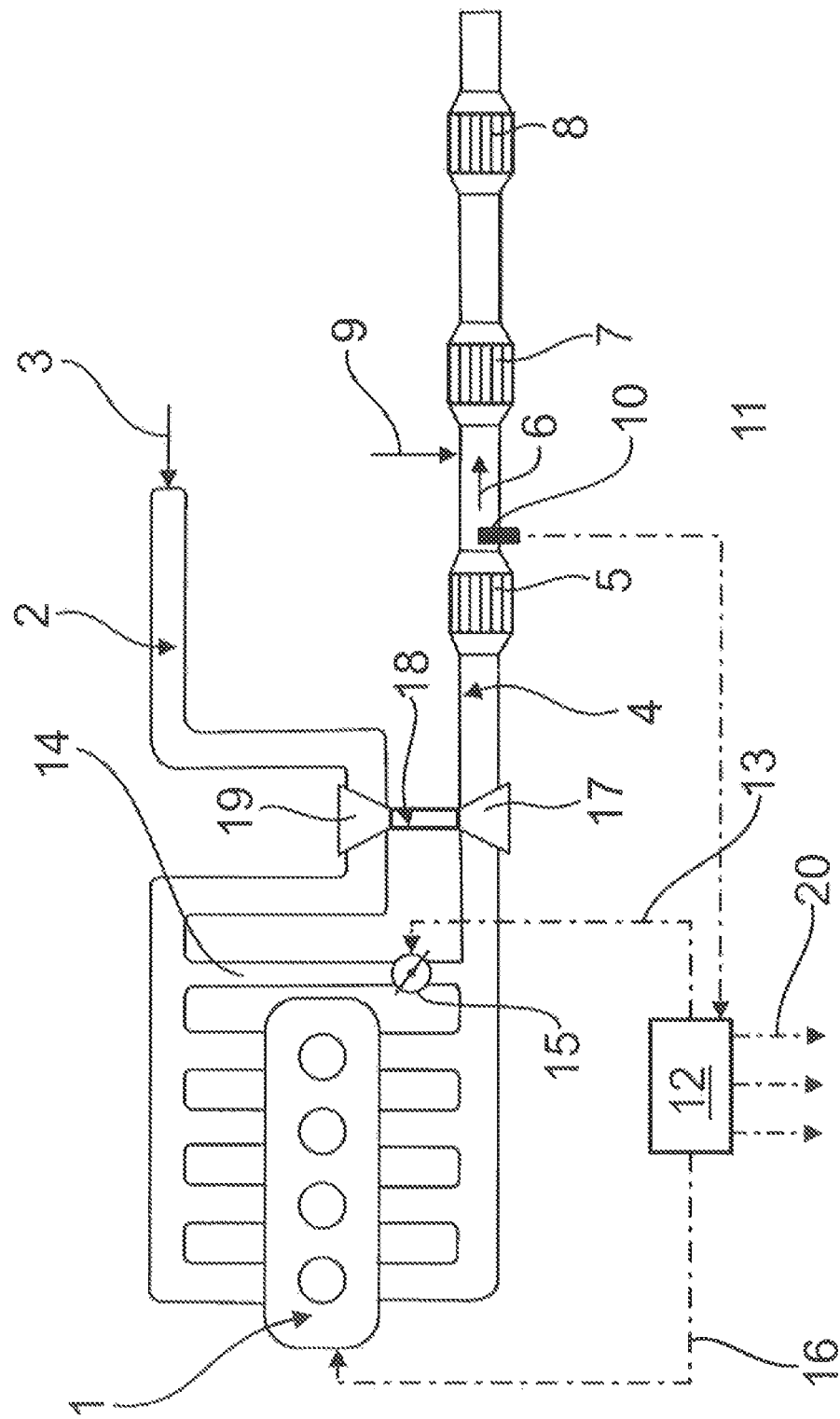
FIG. 1 is a schematic depiction of an internal combustion engine with an exhaust gas post-treatment system comprising an NO oxidation catalyst.

FIG. 1 shows an internal combustion engine 1 to which charge air 3 is supplied via a charge air line 2. From the internal combustion engine 1 an exhaust gas pipe 4 leads to an NO oxidation catalyst 5, which is followed in the flow direction 6 by an SCR catalyst 7. In the flow direction 6 after the SCR catalyst 7 is arranged a particulate filter 8. In the flow direction before the SCR catalyst 7, an arrow 9 indicates the metered addition of a reducing agent, for example an aqueous ammonia solution. Slightly further upstream, an $NO_x$ measurement device 10 is arranged in the exhaust pipe 4 and connected with a control device 12 via a signal line 11. The control device 12 is also connected via line 13 with a shut-off element 15 arranged in an exhaust gas recirculation line 14 and via a further control line 16 with the internal combustion engine 1 for control purposes.

In the exhaust pipe 4 before the NO oxidation catalyst 5 is arranged an exhaust gas turbine 17 of an exhaust turbocharger 18, by means of which in a known manner a compressor 19 in the charge air line 2 is driven to compress the charge air 3.

To test the function capacity, in particular the oxidation capacity, of the NO oxidation catalyst 5, for example in normal operation of the internal combustion engine 1, the hydrocarbon concentration and/or carbon monoxide concentration in the exhaust gas of the internal combustion engine 1 can be raised. For this the control device 12 can specify a late post-injection to generate hydrocarbons, a homogenous charge compression ignition of the internal combustion engine or a partly homogenous internal combustion engine operation in order to provoke a desired increase in the emissions of hydrocarbons and/or carbon monoxide from the internal combustion engine 1. By changing at least one operating parameter of the internal combustion engine 1, the concentration of hydrocarbons and/or carbon monoxide upstream before the NO oxidation catalyst 5 is raised at least to the value of the $NO_x$ concentration upstream before the NO oxidation catalyst 5.

In order to be able to raise the carbon monoxide emissions a desirable manner, by means of the control device 12, for example the shut-off element 15 can be controlled such that the exhaust gas recirculation rate is raised to over 30% in relation to the charge air quantity supplied to the internal combustion engine 1. The recirculated exhaust gas quantity can also be raised in that a choke device, not shown here, is provided in the inlet-side charge air line 2 in order to increase the pressure difference between the exhaust gas and charge air 3.

Alternatively or additionally, via the control line 16 the internal combustion engine 1 can be controlled such that the air/fuel ratio lambda can be lowered for example to below 1.05 and/or the injection pressure can be raised by for example at least 20% or to at least 1200 bar. Alternatively or additionally a shift in injection time for the internal combustion engine 1 can also be provided, for example to at least 20° crank angle but no more than 370° crank angle before the top dead centre (ignition TDC). Also alternatively or additionally a lowering of the compression ratio, in particular by at least 20%, and/or a change in valve opening times can be provided.

Such a change in operating parameters ensures that large quantities of reducing agent, in particular carbon monoxide, are generated in the exhaust gas flow of the internal combustion engine 1 and oxidised on the NO oxidation catalyst 5 by means of the $NO_x$ contained in the exhaust gas flow. The change in $NO_x$ concentration due to oxidation of the carbon monoxide in the exhaust gas flow downstream of the NO oxidation catalyst 5 is detected by means of the $NO_x$ measurement device 10 as an $NO_x$ actual value and transmitted to the control device 12. In the control device 12 the $NO_x$ actual value determined is compared with a predefined or calculated $NO_x$ nominal value as an expected value. If this comparison reveals too great a deviation of the $NO_x$ actual value from the $NO_x$ nominal value, a defective or correspondingly deteriorated function capacity of the NO oxidation catalyst 5 can be concluded. If the actual deviation found is too great, then, for example via a further control line 20 a fault signal can be emitted by the control device 12.

In principle it is also possible to arrange the $NO_x$ measurement device 10 in the exhaust pipe 4 downstream after the SCR catalyst 7 so that the SCR catalyst 7 is included in the test of function capacity. With such an arrangement of the $NO_x$ measurement device 10, during testing of the function capacity of the NO oxidation catalyst 5, at the point marked with arrow 9 no reducing agent is added for the selective catalytic reduction.

Instead of generating larger quantities of reducing agent upstream in the exhaust gas flow before the NO oxidation catalyst 5 by a change in operating parameters, a targeted addition of hydrocarbons as a reducing agent can take place into the exhaust gas pipe 4 before the NO oxidation catalyst 5.

At the end of the test phase in which the function capacity of the NO oxidation catalyst 5 is tested, the internal combustion engine 1 is returned to normal operation. The test phases can then be carried out regularly at greater time intervals.

Figure 2:
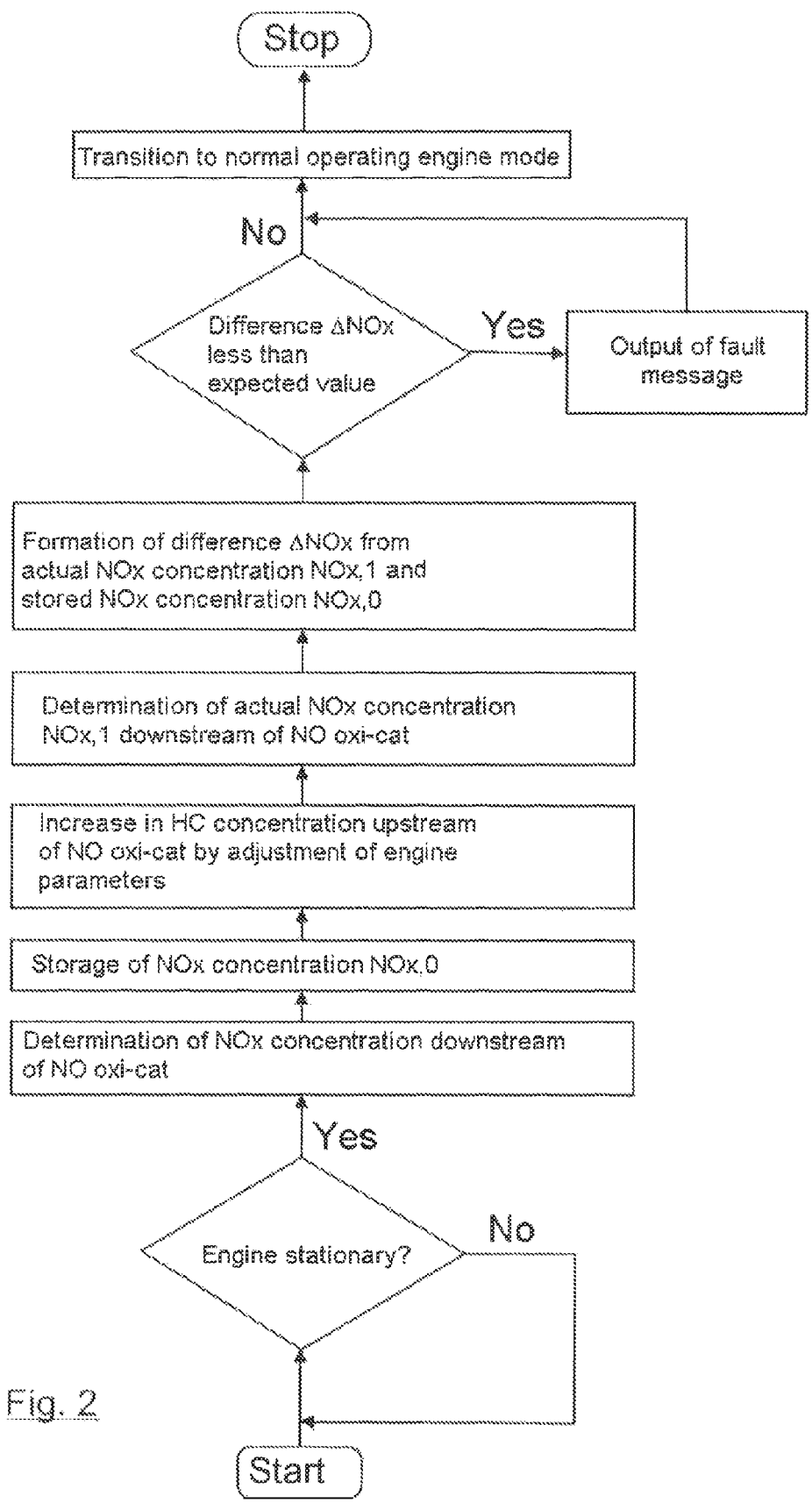
FIG. 2 is a flow diagram to explain the method when the internal combustion engine is operated stationary.

The flow diagram in FIG. 2 shows the individual method steps which are performed on testing the function capacity of the NO oxidation catalyst 5.

In the method shown, after the method start it is first checked whether the engine is in a stationary operation. If so, in the next method step the $NO_x$ concentration downstream after the NO oxidation catalyst 5 (abbreviated to NO oxi-cat) is determined. Then the $NO_x$ concentration is stored as a first actual value $NO_{x,0}$. Then the CO and/or HC concentration upstream before the NO oxidation catalyst 5 is increased in the manner described above, in particular by the adjustment of operating parameters of the internal combustion engine 1. By means of the $NO_x$ measurement device 10 in FIG. 1, the $NO_x$ concentration $N_{x,1}$ downstream after the NO oxidation catalyst 5 is then detected as a second actual value. This second actual value of $NO_x$ concentration can be compared by subtraction with the previously stored value $N_{x,0}$. For the case where the difference determined between the two actual values is less than a predefined expected value, a fault message is output which indicates a reduced or defective function of the NO oxidation catalyst 5. If the difference determined is however greater than or equal to a predefined nominal or expected value, the test phase is exited again and no fault message triggered.

For the case that the $NO_x$ measurement device 10 provided in FIG. 1 is arranged in the exhaust gas flow after the SCR catalyst 7, before determining the two actual values the addition of urea or a corresponding reducing agent provided for the selective catalytic reduction is stopped.

The invention claimed is:

1. A method for testing a function capacity of an NO oxidation catalyst in an exhaust gas flow of an internal combustion engine operated with air surplus, comprising:
   forming, in the NO oxidation catalyst, nitrogen dioxide from nitrogen monoxide emitted by the internal combustion engine;
   changing a concentration of a reducing agent in the exhaust gas flow upstream of the NO oxidation catalyst; and
   determining and evaluating a resulting change in $NO_x$ concentration in the exhaust gas flow within the NO oxidation catalyst and/or downstream after the NO oxidation catalyst to test the function capacity of the NO oxidation catalyst.

2. The method of claim 1, wherein the step of changing comprises adding a defined quantity of the reducing agent to the exhaust flow upstream before the NO oxidation catalyst; and
   the step of determining and evaluating comprises comparing the resulting change in $NO_x$ concentration in the exhaust gas flow with a predefined $NO_x$ nominal value within and/or downstream after the NO oxidation catalyst to determine an $NO_x$ difference, wherein, if too low an $NO_x$ difference is found, an inadequate function capacity is established and/or a fault message given.

3. The method of claim 1, further comprising:
   measuring and storing an $NO_x$ actual value within and/or downstream after the NO oxidation catalyst before the step of changing,
   allocating an $NO_x$ nominal value for the exhaust gas flow within and/or downstream after the NO oxidation catalyst to the change in reducing agent, and
   if an unacceptable deviation from the $NO_x$ nominal value is found, establishing an inadequate function capacity.

4. The method of claim 1, wherein, in the step of changing, a quantity of the reducing agent is added to or generated in the exhaust gas flow, wherein the quantity is defined or predefined such that the reducing agent completely reduces the nitrous oxides ($NO_x$) contained in the exhaust gas flow upstream before the NO oxidation catalyst.

5. The method of claim 4, wherein at least one of a hydrocarbon concentration and a carbon monoxide concentration upstream before the NO oxidation catalyst is at most as high as the $NO_x$ concentration upstream before the NO oxidation catalyst and/or that the ratio of carbon monoxide concentration to hydrocarbon concentration is at least 2:1.

6. The method of claim 1, wherein the reducing agent is carbon monoxide and is generated by homogenous charge compression ignition of the internal combustion engine or by partly homogenous internal combustion engine operation.

7. The method of claim 1, wherein in the step of changing, the injection time of the fuel in the internal combustion engine is advanced, in at least a partly homogeneous internal combustion engine operation, to generate reducing agent, by a 15° crank angle to maximum inclusive 370° crank angle before the top ignition dead centre.

8. The method of claim 7, wherein the injection time is advanced by a 20° crank angle to maximum inclusive 350° crank angle before the top ignition dead centre.

9. The method of claim 1, wherein the step of changing includes, in an at least partly homogenous internal combustion engine operation, to generate the reducing agent, raising a quantity of an exhaust gas recirculated from an exhaust gas side to a charge air side of the internal combustion engine such that the proportion of exhaust gas in the charge air supplied to the internal combustion engine is at least 30% and at most 80%.

10. The method of claim 1, wherein in the step of changing, to generate the reducing agent, the quantity of an exhaust gas recirculated to a combustion chamber of the internal combustion engine and an air/fuel ratio lambda are varied such that a combustion chamber temperature in the range from 40 to 1.02 lambda inclusive, does not exceed 1850K, in the range from 1.02 to 0.98 lambda, does not exceed 1600K inclusive, and in the range below 0.98 lambda, does not exceed 1500K.

11. The method of claim 1, wherein the step of changing includes raising an injection pressure by at least 20% and/or to at least 1200 bar to maximum 3500 bar for generating reducing agent.

12. The method of claim 1, wherein the step of changing includes lowering the compression ratio by at least 20% to maximum 75% and/or not below 6:1 to generate reducing agent.

13. The method of claim 1, wherein the step of changing comprises generating the reducing agent and changing valve opening times of the internal combustion engine during the generating of the reducing agent such that a residual gas quantity is increased and/or a combustion chamber temperature of the internal combustion engine is reduced.

14. The method of claim 13, wherein the valve opening times are changed such that at least one exhaust valve of the internal combustion engine remains open longer and/or at least one inlet valve is opened later and/or closed later.

15. The method of claim 1, wherein the step of determining includes determining an $NO_x$ actual value from an $NO_x$ measurement upstream before the NO oxidation catalyst and from an $NO_x$ measurement downstream after the NO oxidation catalyst.

16. The method of claim 1, wherein the $NO_x$ concentration is measured in the exhaust gas flow downstream after an SCR catalyst arranged after the NO oxidation catalyst in the exhaust gas flow, wherein during testing of the function capacity of the NO oxidation catalyst, an addition of urea or a corresponding reducing agent necessary for the SCR process is interrupted.

17. A device for testing a function capacity of an NO oxidation catalyst arranged in an exhaust pipe of an internal combustion engine operated with air surplus, comprising:
the NO oxidation catalyst configured to form nitrogen dioxide from nitrogen monoxide emitted by the internal combustion engine;
a control device controlling a change in concentration of a reducing agent contained in the exhaust gas flow upstream of the NO oxidation catalyst; and
an $NO_x$ measurement device arranged one of in the NO oxidation catalyst or downstream after the NO oxidation catalyst configured to measure $NO_x$ concentration in the exhaust gas flow and transmit a measured value to the control device for evaluation.

18. The device of claim 17, wherein an SCR catalyst is connected downstream of the NO oxidation catalyst and the $NO_x$ measurement device is arranged downstream after the SCR catalyst.

19. The device of claim 17, wherein the control device controls operating parameters of the internal combustion engine to generate the reducing agent in the exhaust gas flow.

20. The device of claim 19, wherein the control device controls at least one of an exhaust gas recirculation, valve opening times, injection times for the fuel, and a supply of charge air to the internal combustion engine in order to generate the reducing agent in the exhaust gas flow.

* * * * *